No. 845,318. PATENTED FEB. 26, 1907.
J. REDMOND.
VEGETABLE PEELING MACHINE.
APPLICATION FILED APR. 11, 1905.
2 SHEETS—SHEET 1.
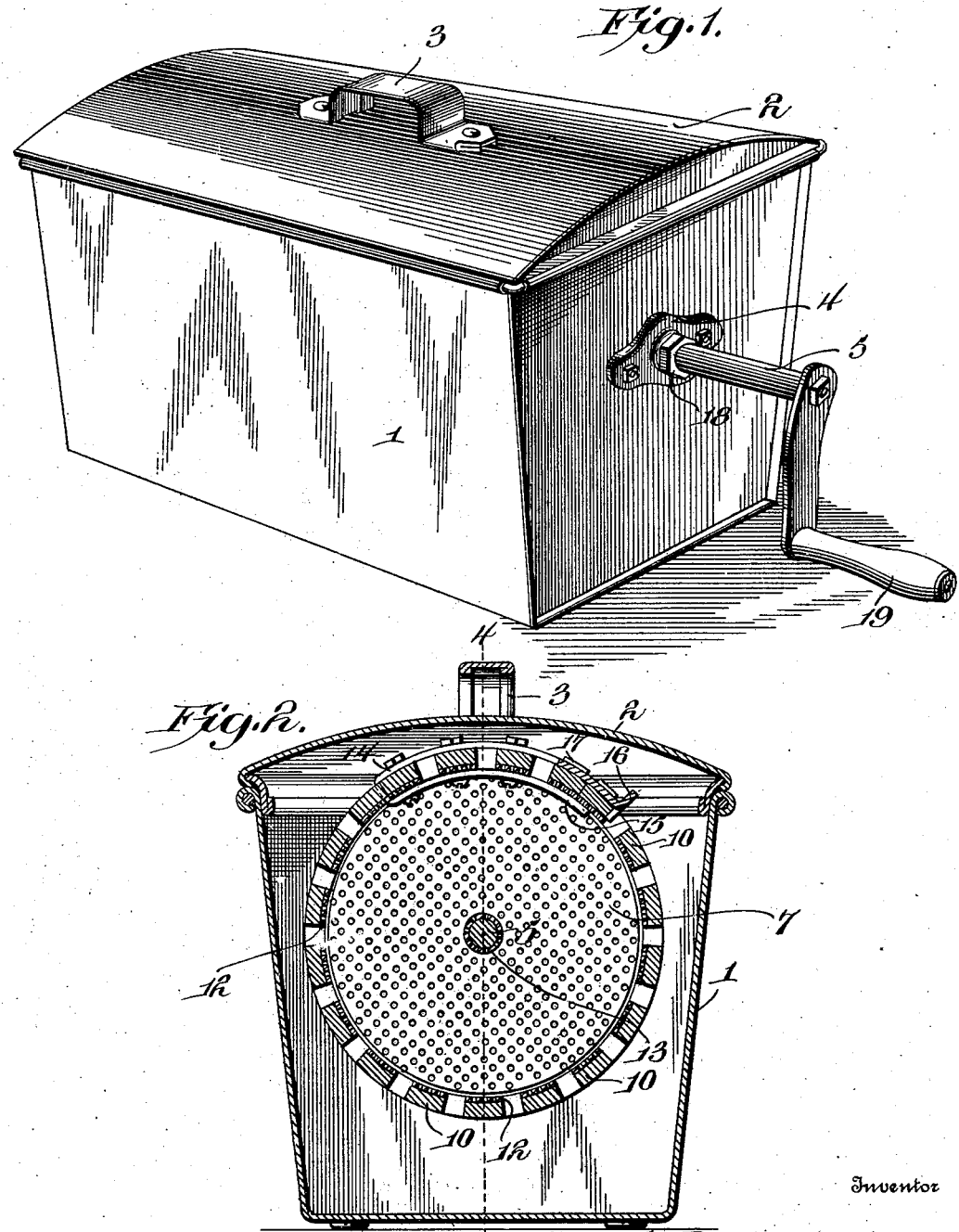

No. 845,318. PATENTED FEB. 26, 1907.
J. REDMOND.
VEGETABLE PEELING MACHINE.
APPLICATION FILED APR. 11, 1905.
2 SHEETS—SHEET 2.
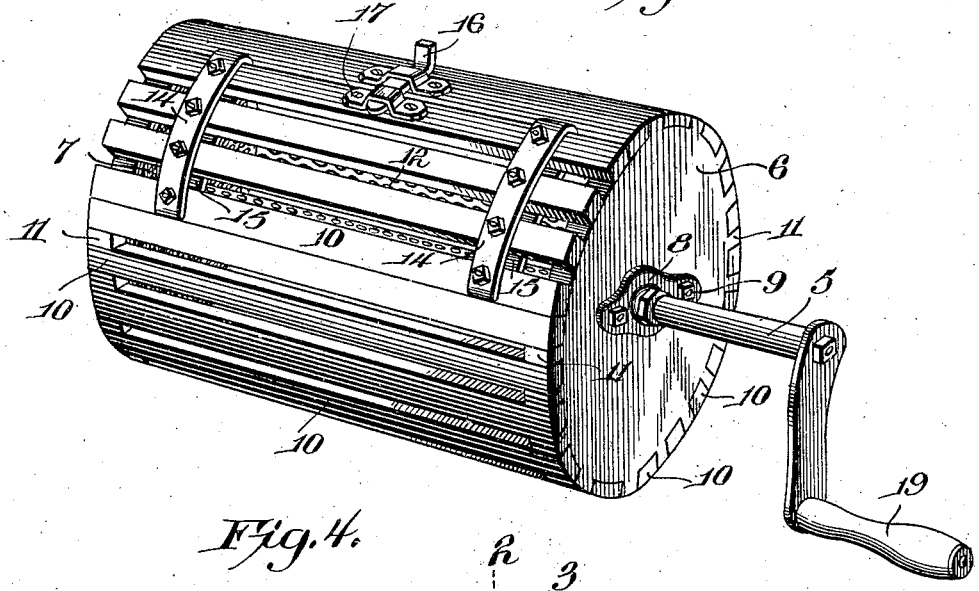
Witnesses
Louis C. Starke
S. A. Fitzgerald
Inventor
Joseph Redmond,
By W. T. Fitzgerald
Attorneys
THE NORRIS PETERS CO., WASHINGTON, D. C.

UNITED STATES PATENT OFFICE.

JOSEPH REDMOND, OF NEW YORK, N. Y.

VEGETABLE-PEELING MACHINE.

No. 845,318.  Specification of Letters Patent.  Patented Feb. 26, 1907.

Application filed April 11, 1905. Serial No. 254,930.

*To all whom it may concern:*

Be it known that I, JOSEPH REDMOND, a citizen of the United States, residing at New York, in the county of New York and State of New York, have invented certain new and useful Improvements in Vegetable-Peeling Machines; and I do hereby declare the following to be a full, clear, and exact description of the invention, such as will enable others skilled in the art to which it appertains to make and use the same.

My invention relates to a machine for removing the skin of various kinds of vegetables, and more particularly for peeling potatoes and leaving them in a cleanly desirable condition ready for use; and my invention consists of certain novel features of combination and construction of parts, the preferred form whereof will be hereinafter clearly set forth, and pointed out in the claim.

Other objects and advantages will be hereinafter made clearly apparent, reference being had to the accompanying drawings, which are considered a part of this application, and in which—

Figure 1 is a perspective view of my invention complete ready for use. Fig. 2 is a central transverse section thereof, as indicated by dotted line 2 2 of Fig. 4. Fig. 3 is a perspective detail view of the revolving cylinder removed from its coöperating casing, while Fig. 4 is a longitudinal sectional view of my invention complete shown in Fig. 1 or as taken on dotted lines 4 4 of Fig. 2.

The various details of my invention and coöperating accessories will for convenience be designated by numerals, the same numeral applying to a similar part throughout the several views, and, referring to the numerals on the drawings—

1 indicates the body portion or casing of my invention, which may be of any desired shape or made of any preferred material, and is provided with a lid-section or closure member 2, having a suitable handle 3 to facilitate removal thereof.

In each end of the casing 1 I provide the bearing-plates 4 to accommodate the shaft 5, which extends through the body portion and carries the head-sections 6, which are disk-like in form, though they may be octagonal, hexagonal, or the like, as preferred. The inner side of each of the head-sections 6 is covered with a piece of sheet metal of proper shape, as indicated by the numeral 7, said plates 7 being perforated in a well-known manner to form a grating-surface. The head-sections 6 are properly mounted upon the shaft 5, as by means of the plates 8, held in an anchored position by the bolts 9 or equivalent means and as clearly shown in Fig. 3. The head-sections or disk-like members 6 are connected together with a plurality of bars or ribs 10, properly spaced or held apart in any preferred way, as by the separating members 11 or equivalent means, and by reference to Fig. 4 it will be observed that the inner face of each of the members 10 is provided with a grating-surface 12, formed of suitable sheet metal, formed with apertures of usual form. In like manner that section of the shaft 5 within the revolving cylinder is also covered with sheet metal, having perforations 13 of the usual form to constitute a grating-surface, thus insuring that the entire inner surface of the rotating cylinder will present a plurality of roughened points of suitable size and character to remove the skin of potatoes or the like without cutting very deeply into the surface thereof, and it therefore follows that when the cylinder is partially filled with potatoes or the like and the cylinder rotated in either direction the potatoes will be brought into engagement with the roughened interior surface and thoroughly peeled. To facilitate the peeling process, the office performed by the casing or body portion 1 is to hold the cylinder almost wholly immersed in water, said casing being filled almost completely with water, so that it will enter between the slats or ribs 10 and throughout the mass of vegetables within the cylinder.

It becomes desirable to provide a suitable closure or lid whereby the vegetables may be easily introduced within the chamber, and any preferred number of slats or ribs 10 may be bolted together, as by suitable strap-irons 14, and one of the outside lips properly hinged to the contiguous stationary rib, or, if preferred, the inner strap-iron 15 may be left extended sufficiently to reach under the first stationary rib and the latch or keeper 16 provided to engage the strap or staple 17, as clearly shown in Fig. 3.

It will be understood that a suitable stuffing-box 18 may be provided for the exterior casing and placed in coöperation with the bearing plate or seat 4, as shown in Figs. 1 and 4.

Obviously any suitable form of handle 19 may be provided for the shaft 14, whereby the latter may be easily rotated in either direction.

While I have described the preferred combination and construction of parts, I desire to comprehend in this application all such substantial equivalents and substitutes as may be considered as fairly falling within the scope and purview of my invention.

Having thus fully described my invention, what I claim as new, and desire to secure by Letters Patent, is—

The herein-described machine for peeling potatoes and the like, comprising a housing constituting a water-receptacle, a shaft rotatably mounted within and extended through the housing, a hollow cylinder mounted on said shaft within the housing and comprising a plurality of bars spaced apart with openings between them and heads to which said bars are secured, grating-surfaces on the inner faces of said heads, bearings for said shaft on the outer faces of the ends of the housing, bearings for said shaft on the outer faces of the heads of said cylinder, means passed through said heads and the bearings thereon and the grating-surfaces and securing the latter and the bearings in position, a sleeve surrounding the shaft within the cylinder and perforated to form a grating-surface, a separate grating-surface in the inner faces of each of said bars, the spaces between said bars being unobstructed and out of alinement with said grating-surfaces, a closure for the housing, and a lid for the cylinder provided with interior and exterior strap-irons, all substantially as and for the purpose specified.

In testimony whereof I have signed my name to this specification in the presence of two subscribing witnesses.

JOSEPH REDMOND.

Witnesses:
WILLIAM LYMAN,
THOS. E. LEAHY.